United States Patent [19]
Lieberman

[11] Patent Number: 5,486,680
[45] Date of Patent: Jan. 23, 1996

[54] WARMING SYSTEM USING A FLEXIBLE BATTERY

[76] Inventor: Mitchell J. Lieberman, 24 Ethan Allan Ave., Colchester, Vt. 05446

[21] Appl. No.: 179,522

[22] Filed: Jan. 10, 1994

[51] Int. Cl.$^6$ ............................. H01M 10/50; H05B 3/34
[52] U.S. Cl. ................. 219/211; 429/120; 429/127; 429/162; 219/202; 219/209; 219/528; 219/549; 2/905
[58] Field of Search .................... 219/211, 209, 219/202, 528, 549; 2/905; 429/127, 120, 162, 7

[56] References Cited

U.S. PATENT DOCUMENTS

| | | | |
|---|---|---|---|
| 3,023,259 | 2/1962 | Coler et al. | 136/6 |
| 3,674,562 | 7/1972 | Schneider et al. | 136/83 R |
| 3,725,133 | 10/1972 | Pollack et al. | 136/114 |
| 4,092,464 | 5/1978 | Dey et al. | 429/127 |
| 4,628,930 | 12/1986 | Williams | 219/211 X |
| 4,703,754 | 11/1987 | Ibbott | 429/127 X |
| 4,761,352 | 8/1988 | Bakos et al. | 429/94 |
| 5,140,131 | 8/1992 | Macher et al. | 219/211 |

Primary Examiner—John S. Maples

[57] ABSTRACT

A warming apparatus in which a flexible battery is intimately associated with a heating element by thermo-coupling the heating element to the surface of the flexible battery. The flexible battery is formed in the shape of garments such as gloves or socks with a heating element attached thereto, which provides the advantage of increasing the electrochemical activity of the battery, permitting the battery to provide a heat sink for the heating element, as well as eliminating lengthy connections between the battery and the heating element, and eliminating bulky and often injury producing batteries.

7 Claims, 8 Drawing Sheets

WARMING SYSTEM USING A FLEXIBLE BATTERY

FIELD OF THE INVENTION

This invention relates to apparatus for providing heat to various parts of the body and, more particularly, to a unique combination of a flat, flexible battery intimately (thermally) associated with a heating element to provide an inexpensive, lightweight, and flexible heating insert for various body garments and devices.

BACKGROUND OF THE INVENTION

The insertion of various types of heating elements into garments is well known. Typically, this is done for items such as socks, boots, gloves, ear muffs, etc., which are used in extreme cold weather situations, Similarly, heating devices are used in various types of emergency home first aid situations.

Although the insertion of heating elements into garments has been known for an extended period of time, several major problems have existed which have prevented the widespread use of such devices.

The major problem has been the size and flexibility of the battery used to power the heating element. Batteries with sufficient power to adequately drive a heating element for a reasonable period of time have, in the past, been generally rectangular in shape and enclosed in a solid case. Thus, in a glove, for example, the battery had to be placed in the wrist portion, which made the glove uncomfortable and even dangerous when used in activities such as skiing. Also, for other items such as boots, or socks, a battery pack has been used and worn at the waist or ankle of the individual, which also resulted in a bulky and often heavy item required to be carried by the user. In addition, of course, the fact that prior batteries used as power sources were bulky, and the fact that long wiring was required between the battery and the heating element, only added to the discomfort of the user.

Chemical heaters, on the other hand, which utilize the exposure to oxygen to begin the heating cycle, are generally of relatively short duration, and once begun do not have convenient shut down.

It is, therefore, an object of the instant invention to provide a heating element for garments which eliminates the problem of a bulky power source.

It is a further object of the instant invention to provide a heating element for garments which is lightweight, inexpensive, readily replaceable and which can adapt to the contour of various body parts.

It is a still further object of this invention to provide a battery-heating element combination in which the two together perform functions of which either is incapable of independently. To wit, where the batteries provide a heat sink for the heating elements, and in which the heating element increases the efficiency of the battery.

Flexible batteries are also known in the prior art. One such battery is described, for example, in U.S. Pat. No. 3,023,259, granted to Myron A. Coler, et al on Feb. 27, 1962. This patent describes a flexible battery which may be wrapped around a person, under his or her clothing, so that body heat may be utilized to maintain the electrochemical system at an efficient operating level under low temperature conditions. The suggested use for the battery described in U.S. Pat. No. 3,023,259 is for operating transistorized radio equipment under Arctic conditions.

Another type of flexible battery is described in U.S. Pat. No. 4,092,464 granted to Arabinda N. Dey on May 30, 1978. This patent describes a high energy battery which is particularly designed to be extremely flexible and pliable without having an adverse effect on its discharge properties either during or after subjection to stress. Although no specific use is described in this patent, it is apparent that this battery could be used to conform to the shape of various body parts. Other flexible batteries are described in U.S. Pat. Nos. 4,761,352, 3,725,133 and 3,674,562.

Even though flexible batteries have been known for over thirty years, and even though it known that body heat will increase the efficiency of a battery by raising its temperature, batteries and heating elements tend to be used in the same old fashioned method where the heating element is used in the usual manner to raise the ambient temperature and the battery is connected through wires and provides a remote source of energy.

SUMMARY OF THE INVENTION

In accordance with the present invention, a warming apparatus is provided which includes a flexible battery for thermally associating therewith a heating element so that the battery may form a heat sink for the heating element and the heating element may raise the temperature of the battery.

It is a feature of the instant invention that affixing the heating element to the flexible battery provides enhanced electrochemical activity for the battery.

It is a further feature of the instant invention that intimately associating the heating element with the flexible battery eliminates the necessity for lengthy electrical connections between the battery and the heating element, and permits the battery to be a heat sink.

It is a still further feature of the instant invention that the flexible battery can be provided in a form corresponding to various body parts such as gloves, socks, earmuffs, etc., such that the battery becomes an integral part of a garment which provides body warming for the user.

It is another feature of the instant invention that battery replacement can be accomplished by removing the body shaped battery portion, which is included within an inner garment, and replacing both the garment and the battery whereby battery replacement does not require destruction of the garment being utilized by the user for body warming purposes.

It is a still further feature of the invention that the battery can be assured of long life through heat sink, and/or on/off switch capabilities.

These and further objects and features of the invention will become apparent to those skilled in the art upon examination of the specification and drawings, and the claims, which follow.

DETAILED DESCRIPTION

Figure 1:
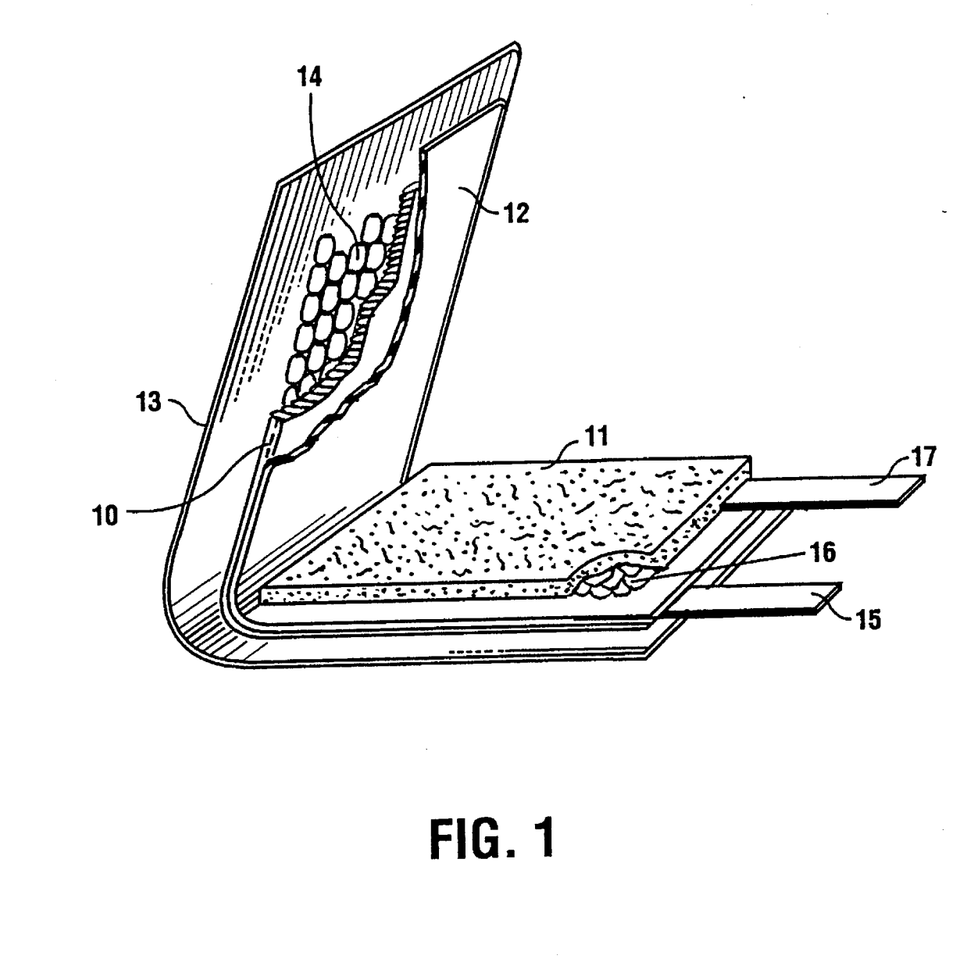
FIGS. 1 and 2 illustrate exemplary batteries for use with the instant invention.

Referring now to FIG. 1, there is shown a flexible battery of the type for use with the instant invention. More specifically, the battery illustrated is of the type shown in U.S. Pat. No. 4,092,464 granted to Mr. Dey on May 30, 1978.

The battery consists of several components. The components include an anode 10, which is folded about a cathode 11. A porous separator 12 separates the anode 10 and the cathode 11 and extends beyond the perimeter of the cathode material. The separator 12 may be any suitable, microporous, thermal plastic material, which is capable of being heat sealed to enclose cathode 11. Suitable materials include polyolefin films, such as those disclosed and described in U.S. Pat. No. 3,351,495, or the other cited patents. Surrounding the anode 10 is a sheet 13 composed of the same type of sealable material as the separator. Sheet 13 extends beyond the perimeter of the anode and is heat sealed to enclose both the anode 10 and the cathode 11. Anode 10 can be made by pressing an active metal sheet onto an expanded metal current collector 14/16. The active metal can be segmented at intervals in order to increase the pliability and ruggedness of the anode.

Two terminals 15 and 17 can be spot welded to the current collectors 14/16 to provide connections for heating elements to be connected to the battery. Element 16 is also a current collector which operates in the same manner as current collector 14. As described in U.S. Pat. No. 4,092,464, a battery such as the one shown in FIG. 1 has enhanced flexural and pliable characteristics. Such a battery can be essentially molded or folded into any shape necessary for use in the embodiment described hereafter. Typically, anode 10 is comprised of the element lithium, where cathode 11 can be a silver chromate, with the separator 12 being a porous polypropylene element. The electrolyte is lithium perchlorate based.

It is, of course, understood that the battery shown in FIG. 1 is exemplary only and that different types of flexible batteries can also be used with the instant invention. Such batteries have been made as thin as 0.020 inches, allowing such batteries to be formed into almost any configuration. An example of a battery of this thickness is shown in U.S. Pat. No. 3,674,562.

Figure 2:
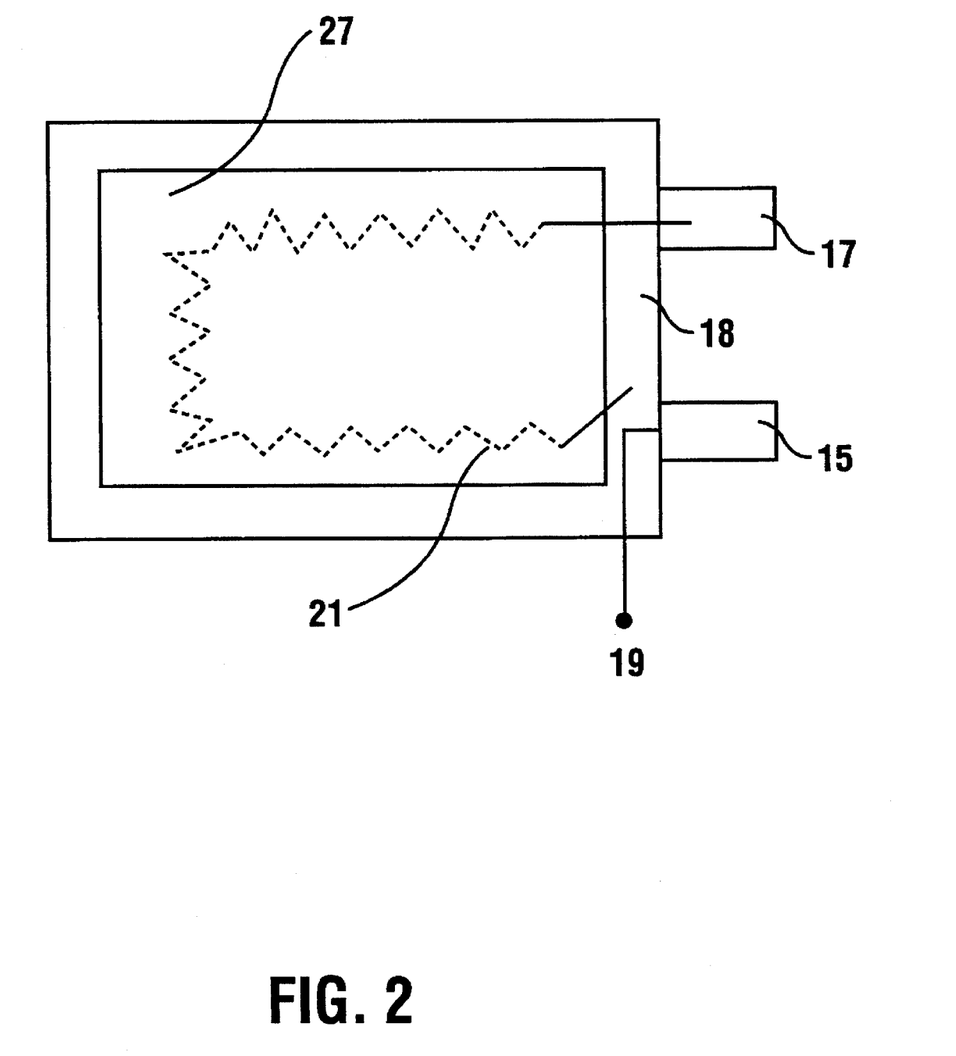

FIG. 2 shows a top view of the finished battery shown in FIG. 1. The entire battery is encapsulated in a pouch or foil laminate bag 27. The foil laminate bag is formed by folding a planar sheet of a composite plastic-metal material, such as one having an aluminum foil layer sandwiched between two polyethylene layers, and heat sealing the ends of the folded sheet as shown. Heat sealing takes place at the periphery 18 to ensure complete encapsulation of the battery. Again, electro-connection is made via terminals 15 and 17.

The heating element to be used with the instant invention is shown in phantom at 21 in FIG. 2. As shown, the heating element is placed directly atop the battery between the outer pouch 27, and an inner layer, or for extra protection outside pouch 27, with a second pouch (not shown) surrounding pouch 27. The second pouch may be of polyethylene. Connections are made to terminals 15 and 17, through a switch 19, as shown in FIG. 2. Switch 19 can be any flat switch of which a great variety are known in the art. It needs to be able to conduct 2 amps in the example shown, and may as well be pressure sensitive so that current conduction take place only when pressure is applied to the on/off button. In either case it should be normally open. Alternatively, the on/off switch may be any small timing circuit. In the latter case, the battery itself may provide the voltage for the timing circuit through another connection to the opposite battery terminal (not shown). Placing the heating element in a manner which is intimately associated with the battery has several advantages. One advantage is that the element itself, as heated, will also heat the associated battery, serving to enhance the electrochemical performance of the battery in cold weather situations. In addition, as will be described below, the battery, along with the intimately associated heating element, becomes part of the body warming garment, thereby completely eliminating lengthy electrical connections between terminals 15 and 17 and the heating element.

Moreover, as will be apparent, regardless of the temperature, the battery upon being switched on, will provide a heat sink dependent, of course, upon the electrochemistry of the battery. Generally, the greater the amount of fluid (electrolyte), the greater the thermal properties, and the longer the retention of heat. In this way, it operates much like electric radiators which have circulating water.

Although shown in a pouch, such pouch may be eliminated through gluing of the heater wire to the surface of the battery by a flexible heat resistant glue, or alternatively by the gluing of a fabric pouch containing the heating wire to the battery.

As a still further alternative, the pouch may be constituted by one additional element, e.g., polyeurethane film, on one side of the finished battery only, in which case the sealing need only take place in the immediate vicinity of the heater element, or at one side of the battery edges. It is only necessary in accordance with the invention that a substantial portion of the heating element be intimately associated with the battery. Intimately associated means connected in such a fashion that some of the heat from the heating element be transferred to the battery. It will be appreciated that this may be accomplished simply by having the battery and heating element in close proximity to one another without the necessity that they be contiguous.

The heating element itself can be made of various resistance wires, such as the resistance wires made by Molecu Wire Corporation of Farmingdale, N.J. Such wire typically has a diameter of 0.01 inches, with a resistance of 6.76 ohms per foot. The total resistance for the heating element, of course, will depend on the particular application for which the battery is being used. In addition, the resistance of the heating element must be matched to the voltage of the battery being used to insure sufficient current flow to generate heat for the particular application.

Assuming, for example, that 0.5 amps is sufficient to generate heat for the application under consideration, and further assuming a battery which would generate 3 volts, the resistance of the heating element would be limited to 6 ohms. With the resistance wire used for the heating element having a resistance of approximately 6 ohms per foot, it is thereby understood that one foot of resistance wire could be used for the heating element and generate one-half amp of current flow, while utilizing a three volt battery.

Figure 3:
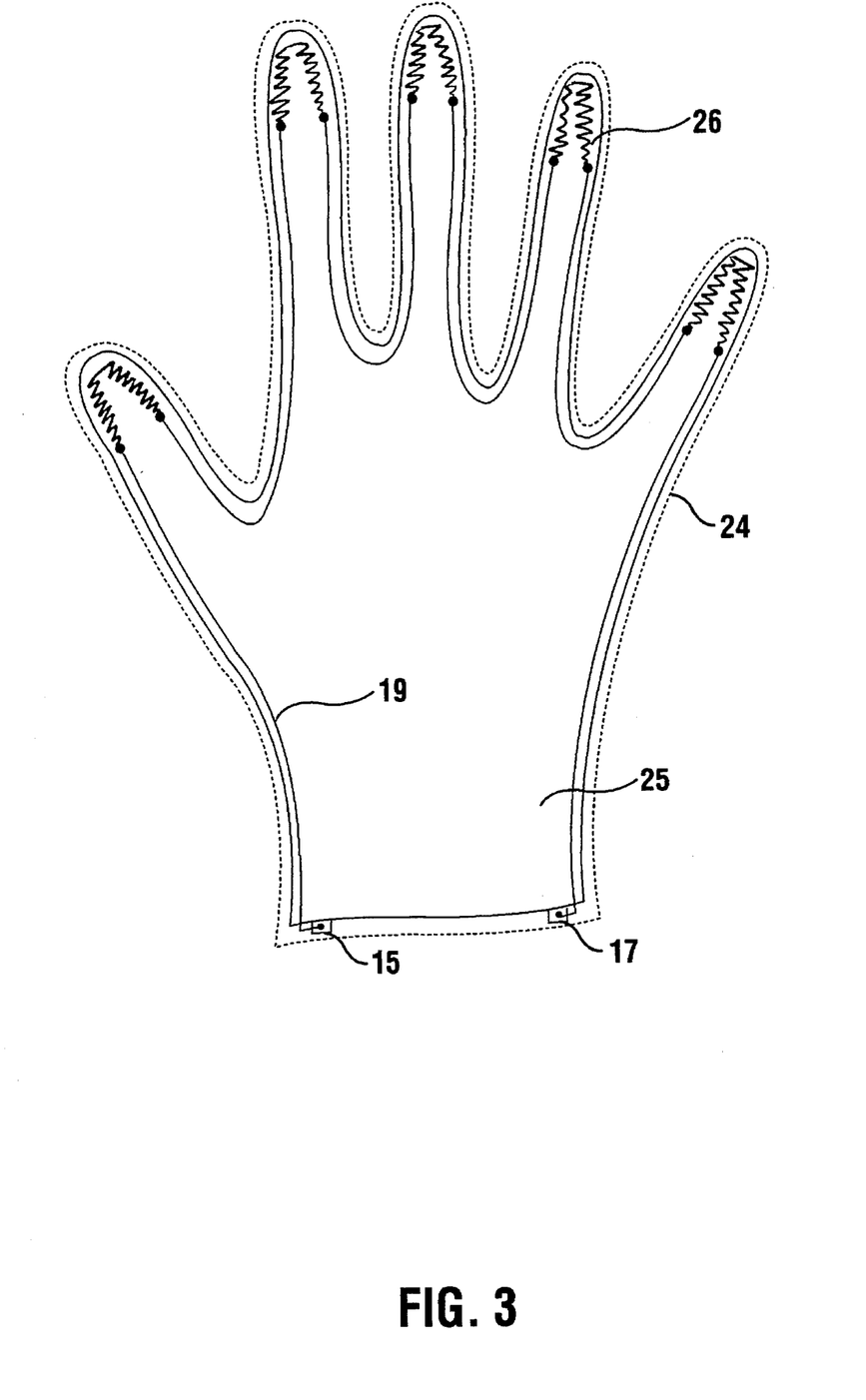
FIGS. 3 and 4 illustrate one embodiment of the instant invention for use in a glove.

Referring now to FIG. 3, there is shown a first embodiment of the instant invention. More particularly, as described above, a battery of the type shown in FIG. 1 can be manufactured in any particular shape as required. Accordingly, the battery would be manufactured in a glove shape as shown at 25 in FIG. 3. Attached to the battery is the heating element 26, which is attached to battery terminals 15 and 17. In this particular embodiment, the actual resistance wire is only shown at the tips of the finger portions of the battery shape, in that this area of the body particularly requires heating in very cold weather.

As an exemplary embodiment, the battery 25 would be enclosed within a glove 24 made of very light weight, highly flexible material such as Spandex material. The outer covering 24 would be glued or attached to battery 25 in any standard manner. For example, the outer glove 24 could be sewn to the battery along the heat sealed areas, such as area 18 shown in FIG. 2. In this manner, the battery would be in the form of a glove, with the actual battery portion being on the top of the hand which forms the battery glove. Switch 19 operates as described above.

Figure 4:
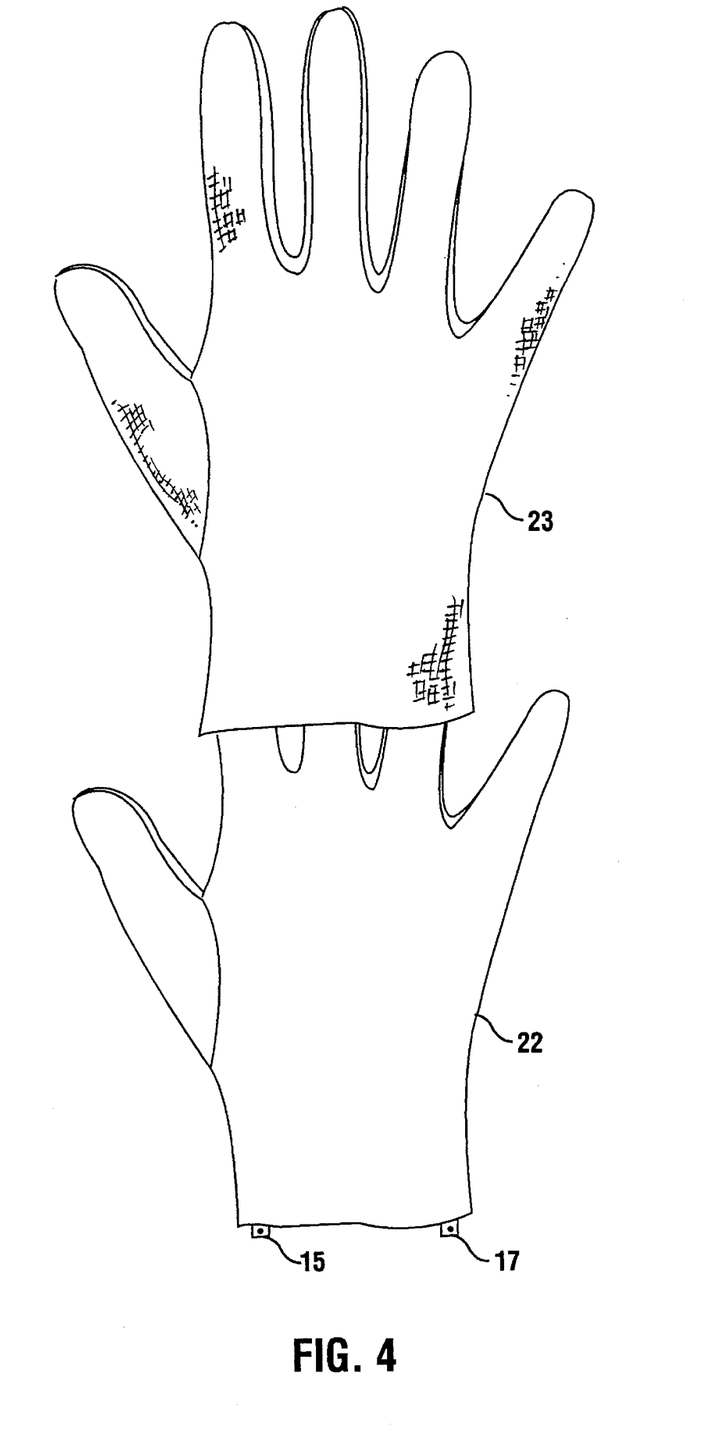

The battery and glove combination shown in FIG. 3 is illustrated at 22 in FIG. 4. The battery glove combination is then inserted within an outer standard glove 23 as shown in FIG. 4. Accordingly, the battery itself (in a glove shape), with the heating element attached, is fitted within a standard outer glove, with the outer glove, of course, providing moisture proofing and additional insulation for the wearer's hand.

It is significant that replacement of the battery is accomplished by simply removing inner glove 22, which forms an integral part of the battery heating element combination. Accordingly, to remove or replace the battery, it is simply necessary to remove inner glove 22 and replace it with another inner glove which provides the heating source for outer glove 23. Due to the fact that the actual glove 22 consists primarily of the battery shown at 25 in FIG. 3, and is made of very light material, the additional cost for replacing the entire inner glove is minimal. The majority of the cost involved with the battery glove combination, of course, stems from the battery and heating element itself, with the heating element and insert glove 22 being a minor portion of these costs. Accordingly, for a user requiring battery replacement, he or she would simply purchase a battery/heating element in the shape of glove 22, which would then be reinserted in glove 23.

Figure 5:
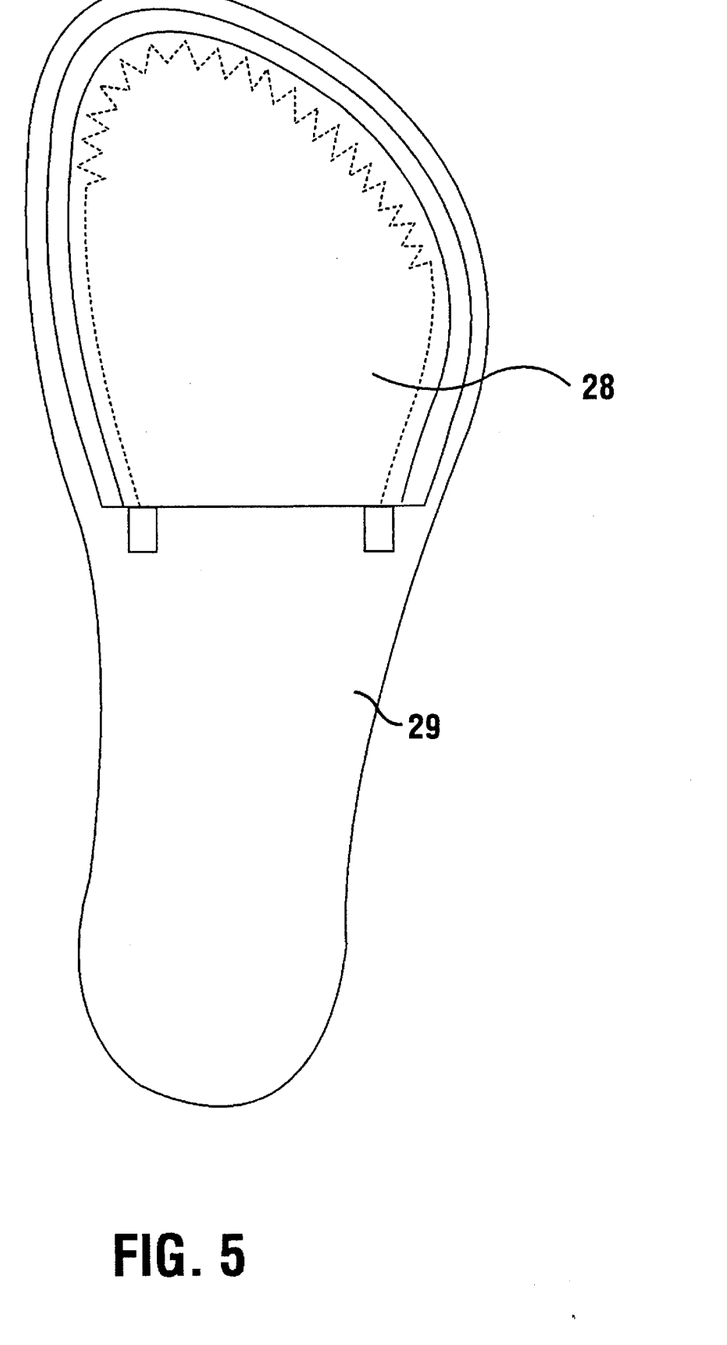
FIGS. 5 and 6 illustrate a second embodiment of the invention for use in a sock.
Figure 6:
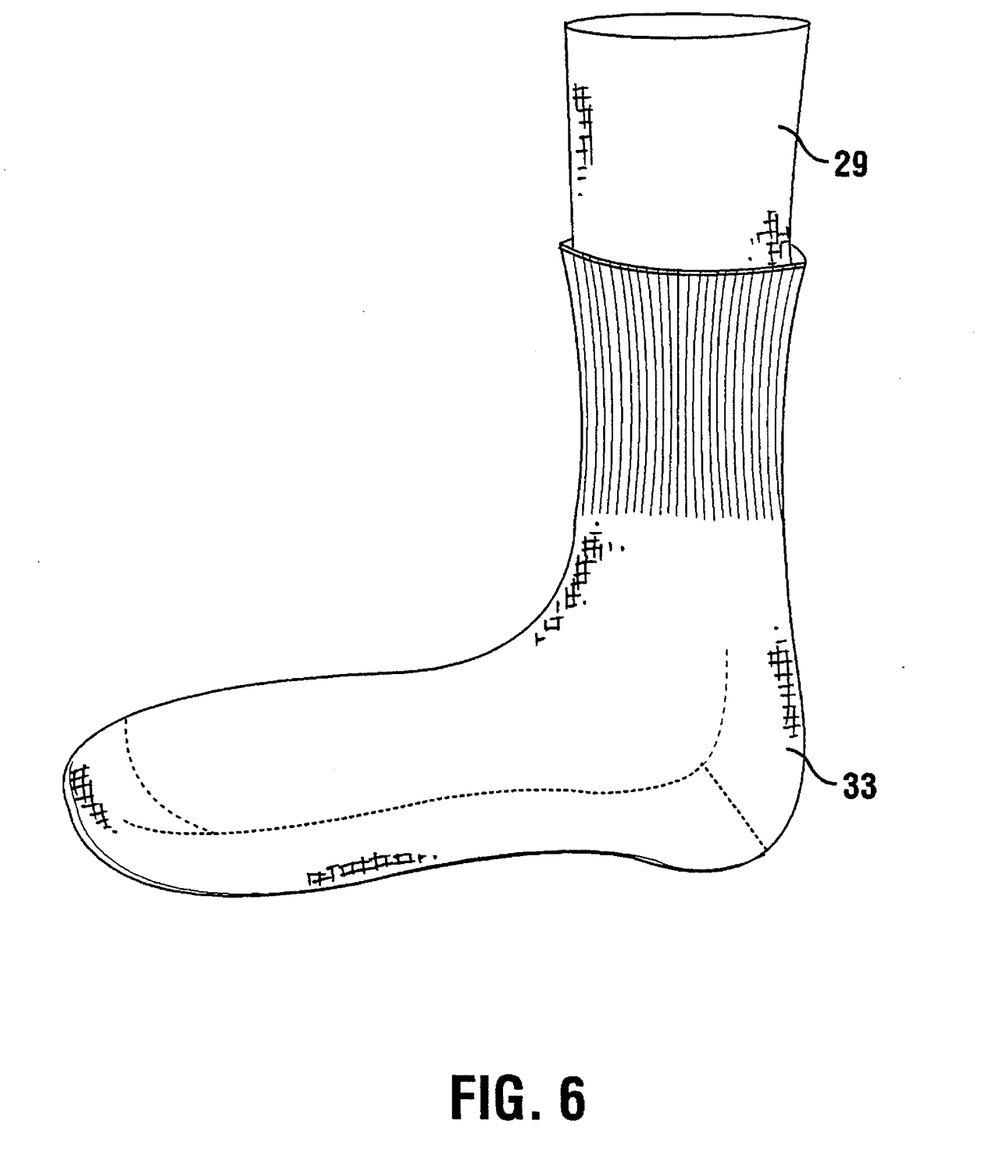

Referring now to FIG. 5, there is shown another embodiment of the instant invention. In this instance battery 28, along with its associated heating element, is attached to the lower surface of an inner sock 29. Again, sock 29 would be made of a very light weight material and function simply as an envelope to hold battery 28, along with its associated heating element. As shown in FIG. 6, inner sock 29 would then be placed within a normal outer sock 33 to provide the heating necessary for the user. Again, replacement of battery 28 would be accomplished by simply removing inner sock 29, and replacing it with an equivalent battery sock that would provide the heating for the particular application in mind. As shown in FIG. 5, the battery and the heating element being placed on the lower surface of the wearer's foot would provide sufficient heating for the user in cold weather conditions. Due to the flexibility and thinness of battery 28, the wearer would be essentially unaware of the presence of the battery, except for, of course, the heat generated by the heating element in combination with battery 28.

In the case of socks, a preferred position of the heating element is under the toes. The battery itself may conform to the bottom of the foot, or may be located only in the toe portion, either as a portion of the sock as with the glove, or as a stand alone pad of FIG. 2. In this case, the on/off switch, not shown, would have to be in the upper portion of the sock so as to be easily reached.

Figure 7:
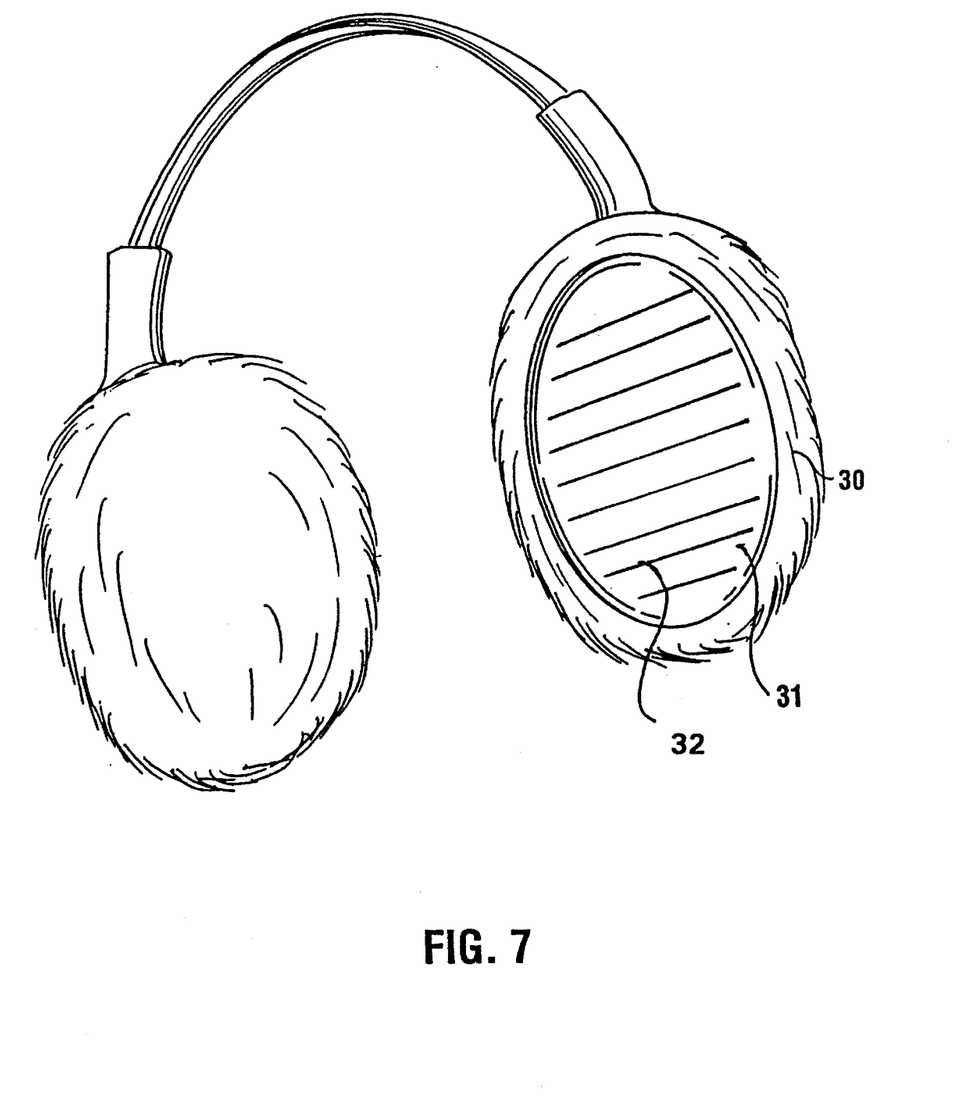
FIGS. 7 and 8 illustrate a third embodiment of the invention for use in an earmuff.
Figure 8:
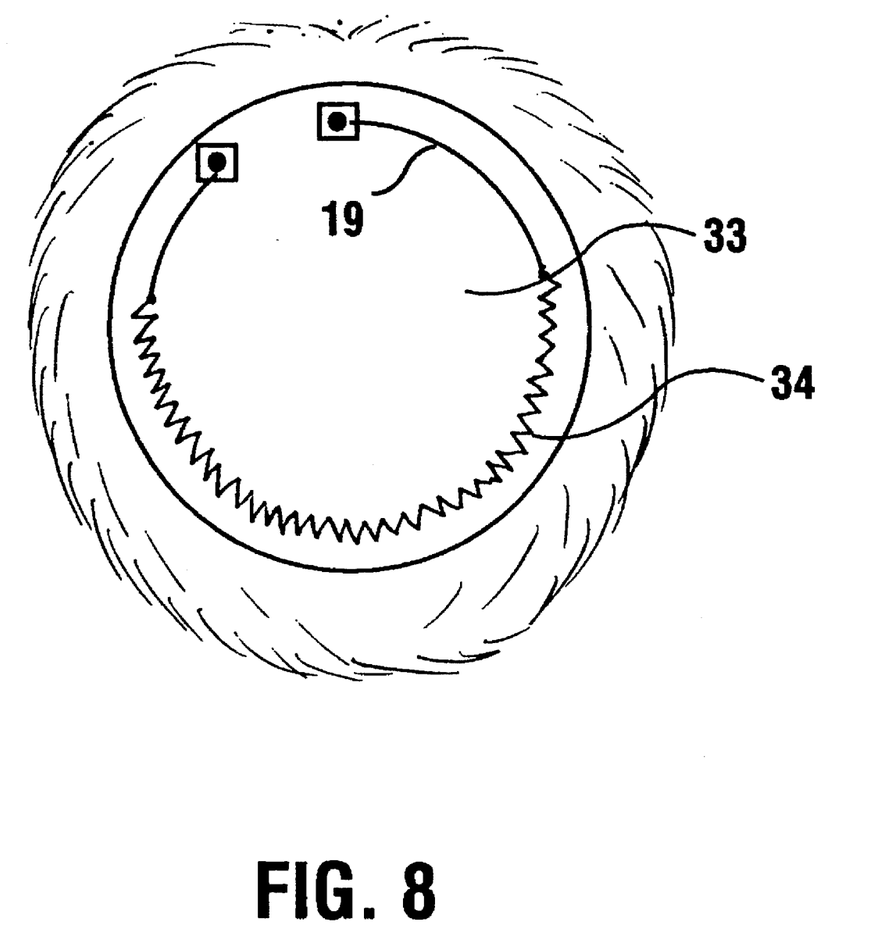

Referring now to FIGS. 7 and 8, there is shown another embodiment of the invention in which the combination heating element and battery would be inserted within earmuffs. For example, as shown in FIG. 8, battery 33 has associated therewith heating element 34, which is then inserted within earmuff 30. Covering the outer surface of the battery could be an initial layer 31 (FIG. 7) having apertures placed therein at 32 to allow heat to be applied to the wearer's ears. Again, replacing the battery would simply mean removing a layer 31, and then removing battery 34, for which a replacement would be available to fit within the earmuff 30.

The essence of the instant invention is the use of a heating element intimately associated with a flexible battery. In this manner, the heating element enhances the electrochemical activity of the battery, and also eliminates the necessity for running long wires from the battery to the heating element. This, of course, eliminates the problems of wire breakage. In addition, battery replacement does not require partial destruction of the garment being heated, as the battery and heating element itself can be removed and replaced in one piece. It is, of course, understood that for commercial use, batteries for some embodiments such as where incorporated within socks or gloves could be manufactured in the particular shape required. However, the lightweight garment holding the battery, such as sock 29, or glove 24, would not necessarily increase the expense of battery replacement as this would simply be a lightweight shell necessary to hold the battery in the particular form required for the use in mind.

The invention has been described in detail with particular reference to proffered embodiments thereof. It will be understood that variations and modifications can be executed within the spirit and scope of the invention.

I claim:

1. A body warming apparatus comprising,
    a substantially planar flexible battery having first and second battery terminals,
    a substantially planar heating element coupled to said first and second battery terminals, said heating element being disposed overlaying and in close proximity with said flexible battery, whereby at least a portion of the heat from said heating element heats said battery.

2. A body warming apparatus in accordance with claim 1, wherein said battery is connected to said heating element through a normally open on/off switch.

3. A body warming apparatus in accordance with claim 1, wherein at least a portion of said heating element lies contiguous said battery.

4. A body warming apparatus in accordance with claim 3, where all of said heating element is affixed directly to the surface of said flexible battery.

5. A body warming apparatus in accordance with claim 1, further comprising a pouch with said heating element being disposed between the pouch and the battery surface.

6. A body warming apparatus in accordance with claim 1, wherein said flexible battery and said heating element form a portion of a replaceable garment, said replaceable garment being configured to be worn over an appendage of a person.

7. A body warming apparatus in accordance with claim 2, wherein said on/off switch is a timing circuit.

* * * * *